(12) United States Patent
Fermann et al.

(10) Patent No.: US 8,970,947 B2
(45) Date of Patent: Mar. 3, 2015

(54) AUTO-CLADDED MULTI-CORE OPTICAL FIBERS

(75) Inventors: Martin E. Fermann, Dexter, MI (US); Liang Dong, Clemson, SC (US); Libin Fu, Ann Arbor, MI (US); Hugh A. McKay, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 643 days.

(21) Appl. No.: 12/967,772

(22) Filed: Dec. 14, 2010

(65) Prior Publication Data

US 2011/0141555 A1 Jun. 16, 2011

Related U.S. Application Data

(66) Substitute for application No. 61/286,737, filed on Dec. 15, 2009.

(51) Int. Cl.
*G02B 6/028* (2006.01)
*G02B 6/036* (2006.01)
*H04B 10/17* (2006.01)
*H01S 3/067* (2006.01)
*G02B 6/02* (2006.01)
*H01S 3/08* (2006.01)
(Continued)

(52) U.S. Cl.
CPC ........ *H01S 3/06729* (2013.01); *G02B 6/02009* (2013.01); *G02B 6/02366* (2013.01); *G02B 6/0281* (2013.01); *G02B 6/03611* (2013.01); *G02B 6/03644* (2013.01); *G02B 6/02042* (2013.01); *H01S 3/06733* (2013.01); *H01S 3/06737* (2013.01); *H01S 3/06754* (2013.01); *H01S 3/08059* (2013.01); *H01S 3/094011* (2013.01); *H01S 3/094042* (2013.01); *H01S 3/1608* (2013.01); *H01S 3/1618* (2013.01)
USPC ........................ 359/341.1; 385/124

(58) Field of Classification Search
USPC ........................ 359/341.1; 385/124
See application file for complete search history.

(56) References Cited

U.S. PATENT DOCUMENTS 4,493,720 A * 1/1985 Gauthier et al. ................ 65/391
4,815,079 A   3/1989 Snitzer
(Continued)

FOREIGN PATENT DOCUMENTS

DE   102007045097   4/2009
WO   WO 2009/042347   4/2009
WO   WO 2010/065788   6/2010

OTHER PUBLICATIONS

John M.Fini, "Design of Solid and Microstructure Fibers for Suppression of Higher-Order Modes", Optics Express, vol. 13, No. 9, pp. 3477-3490, May 2, 2005.
(Continued)

*Primary Examiner* — Eric Bolda
(74) *Attorney, Agent, or Firm* — Knobbe, Martens, Olson & Bear, LLP (57) ABSTRACT

Embodiments of auto-cladded optical fibers are described. The fibers may have a refractive index profile having a small relative refractive index change. For example, the fiber may include an auto-cladded structure having, e.g., a trough or gradient in the refractive index profile. A beam of light propagating in the fiber may be guided, at least in part, with the auto-cladded structure. In some embodiments, the optical fiber may be all glass. In some embodiments, the optical fiber may include a large-core or an ultra large-core.

24 Claims, 6 Drawing Sheets

(51) Int. Cl.
*H01S 3/094* (2006.01)
*H01S 3/16* (2006.01)

(56) References Cited

U.S. PATENT DOCUMENTS

| | | | |
|---|---|---|---|
| 5,818,630 | A | 10/1998 | Fermann |
| 5,847,863 | A | 12/1998 | Galvanauskas |
| 6,751,388 | B2 | 6/2004 | Siegman |
| 6,904,219 | B1 | 6/2005 | Fermann |
| 7,280,730 | B2 | 10/2007 | Dong |
| 7,289,709 | B2 | 10/2007 | Folkenberg |
| 7,924,500 | B1 * | 4/2011 | Minelly .................... 359/341.1 |
| 8,159,742 | B2 | 4/2012 | Dong et al. |
| 8,406,593 | B2 * | 3/2013 | Molin et al. ................. 385/124 |
| 8,498,046 | B2 | 7/2013 | Dong |
| 2008/0198879 | A1 | 8/2008 | McComb |
| 2009/0092157 | A1 * | 4/2009 | Gapontsev ........................ 372/6 |
| 2009/0123121 | A1 | 5/2009 | Dong |
| 2009/0201575 | A1 | 8/2009 | Fermann |
| 2010/0157418 | A1 | 6/2010 | Dong |
| 2010/0251771 | A1 | 10/2010 | Langner |
| 2011/0069723 | A1 | 3/2011 | Dong |
| 2012/0188632 | A1 | 7/2012 | Dong et al. |

OTHER PUBLICATIONS

L. Fu et al., "Extremely Large Mode Area Optical Fibers Formed by Thermal Stress," Optics Express, vol. 17, No. 14, pp. 11782-11793, Jul. 6, 2009.

T. Hasegawa et al., "Hole-assisted lightguide fiber for large anomalous dispersion and low optical loss", Optics Express vol. 9, No. 13, pp. 681-686, Dec. 17, 2001.

A. Langner et al., "Comparison of Silica-Based Materials and Fibers in Side- and End-Pumped Fiber Lasers", Proc. of SPIE, vol. 7195, pp. 71950Q-1-71950Q-9, 2009.

* cited by examiner

AUTO-CLADDED MULTI-CORE OPTICAL FIBERS

CROSS-REFERENCE TO RELATED APPLICATIONS

This application claims the benefit under 35 U.S.C. §119 (e) of U.S. Provisional Patent Application No. 61/286,737, filed Dec. 15, 2009, entitled "AUTO-CLADDED LARGE-CORE OPTICAL FIBERS," the entire contents of which is hereby incorporated by reference herein and made a part of this specification.

This application is related to International Patent Application PCT/US2008/074668, filed Aug. 28, 2008, entitled "GLASS LARGE-CORE OPTICAL FIBERS", published as International Publication No. WO 2009/042347, which claims priority to U.S. Provisional Patent Application No. 60/975,478, filed Sep. 26, 2007, entitled "GLASS LARGE-CORE OPTICAL FIBERS" and to U.S. Provisional Patent Application No. 61/086,433, filed Aug. 5, 2008, entitled "GLASS LARGE-CORE OPTICAL FIBERS." All of the above-listed applications (international and provisional) and publications are hereby incorporated by reference herein in their entireties and made a part of this specification. This application is also related to U.S. patent application Ser. No. 12/641,262, filed Dec. 17, 2009, entitled "GLASS LARGE-CORE OPTICAL FIBERS," published as U.S. Patent Application Publication No. 2010/0157418, which is hereby incorporated by reference herein and made a part of this specification.

This application is also related to U.S. patent application Ser. No. 12/630,550 entitled "HIGHLY RARE-EARTH-DOPED OPTICAL FIBERS FOR FIBER LASERS AND AMPLIFIERS", filed Dec. 3, 2009, which is hereby incorporated by reference herein in its entirety and made a part of this specification. This application also incorporates by reference the entire disclosure of International Patent Publication No. WO 2010/065788, entitled, "HIGHLY RARE-EARTH-DOPED OPTICAL FIBERS FOR FIBER LASERS AND AMPLIFIERS."

BACKGROUND

1. Field

Various embodiments relate to optical fibers such as, for example, optical fibers with large core dimensions, optical fibers that support single mode propagation, and multi-core fibers, as well as their use as optical amplifiers or lasers.

2. Description of the Related Art

Single mode optical fibers provide a flexible delivery medium for high quality optical beams. Conventional single mode fibers typically have a core diameter below 9 µm. However, the small core diameter of conventional single mode fiber is not well suited for delivery of high power optical beams. High optical intensity beams propagating in these fibers can cause strong nonlinear effects such as self-phase modulation, Raman scattering, Brillouin scattering, etc. Self-phase modulation can lead to pulse distortions. Raman and Brillouin scattering can lead to significant power loss during transmission.

Recently, fiber amplifiers and lasers based on rare-earth ions have found advantages in many applications over their solid state counterparts and their power level has been improving. However, in applications requiring high pulse energies and high peak pulse powers, fiber amplifiers still lag their solid-state counterparts because of the small mode area of optical fibers leading to significant nonlinear pulse distortions and optical damage at high peak powers, whereas mode sizes in solid-state amplifier materials can be scaled indefinitely, only limited by thermal considerations or material growth limitations.

The upper peak power limit for fiber lasers may be extended with designs using a large core diameter. Indeed many approaches have been suggested for increasing the fundamental mode area of optical fibers, based for example and not limited to fundamental mode propagation in multimode fibers (U.S. Pat. No. 5,818,630), photonic crystal or micro-structured fibers (U.S. Pat. No. 7,289,709), leakage channel or holey fibers (U.S. Pat. No. 7,280,730, U.S. Patent Application Pub. No. 2009/0123121, and International Pub. No. WO 2009/042347, which is incorporated by reference herein for the material specifically referred to herein and for all other material that it discloses) and gain-guided or anti-guided fibers (U.S. Pat. Nos. 5,818,630, 6,751,388, and U.S. Patent Application Pub. No. 2008/0198879) as well as stress guided fibers (International Pub. No. WO 2009/042347, which is incorporated by reference herein for the material specifically referred to herein and for all other material that it discloses). Examples of coherent addition of multi-core fibers have been described for fiber mode area scaling in "High Power Parallel Fiber Arrays", published as U.S. Patent Application Pub. No. 2009/0201575.

In a system described in U.S. Pat. No. 6,904,219 (to Fermann), Fermann described embodiments of a planar waveguide with conventional waveguiding in the small axis and a thermal lens in the long axis.

High power fiber amplifiers and lasers can be cladding pumped as, for example, embodiments described in U.S. Pat. Nos. 4,815,079 and 5,818,630. However, it has also been realized in U.S. Pat. No. 5,847,863 to Galvanauskas et al. that embodiments of high power fiber amplifiers and lasers can be directly core-pumped using another high power fiber laser, where the fiber pump laser can then be conveniently cladding pumped. Both the pump source and the amplifier can be based on the same rare earth gain medium. The concept has recently been extended with the use of highly doped Yb fibers as pump sources as well as amplifier sources (e.g., U.S. patent application Ser. No. 12/630,550, which is incorporated by reference herein for the material specifically referred to herein and for all other material that it discloses).

SUMMARY

Applicant has recognized there is a need for embodiments of large mode area single core and multi-core fibers that can be efficiently and reproducibly manufactured. Some of these embodiments can be used as optical amplifiers and/or lasers for high peak power pulses.

In certain embodiments, auto-cladded optical fibers are provided. The fibers may have a refractive index profile having a small relative refractive index change. For example, the fiber may comprise an auto-cladded structure comprising, e.g., a trough in the refractive index profile. The auto-cladded structure may be disposed at an interface between a core and a cladding of the fiber. A beam propagating in the fiber core may be guided, at least in part, with the auto-cladded structure. In some embodiments all glass fibers are provided. Some embodiments include large-core or ultra large-core optical fibers.

In at least one embodiment a core of the auto-cladded fiber is bounded, at least in part, by a narrow region having a reduced refractive index relative to a refractive index of at least a portion of the core. At least a portion of the core may comprise a non-uniform refractive index profile. The portion of the core may comprise an index gradient having a maximum at about the center of the portion of the core and that may decrease from the center to the edge of the portion of the core.

In at least one embodiment an all-glass fiber is provided. The fiber comprises a core and cladding material, the core and cladding material further having a common interface, the core and cladding material selected from substantially identical glasses, the fiber configured to support low-loss propagation of at least the lowest-order core mode.

In at least one embodiment an all-glass fiber amplifier is provided. The amplifier comprises a rare-earth doped core and cladding material. A near diffraction-limited pump source coupled into the rare-earth doped core provides pumping. The rare-earth doped fiber core amplifies at least the lowest-order core mode.

In at least one embodiment an all-glass fiber is provided. The fiber comprises a core and cladding material having a common interface. The core material may have a diameter d, with d having a value between about 50 μm to about 500 μm. The core material can be configured to support at least low-loss propagation of the fundamental mode, the fundamental mode having an effective mode area A less than approximately $\pi d^2/2$.

In some embodiments, a multi-core fiber amplifier comprises an optical pump source, and an optical signal source. The amplifier comprises a fiber having multiple cores. The optical pump source can be delivered into at least some of the multiple cores via a diffractive beam splitter.

In various embodiments, auto-cladded fibers can be fabricated by constructing optical fibers with core and cladding made from near identical glass materials with a common interface. In one embodiment an auto-cladding is produced by a modification to the core-cladding interface. The auto-cladding can comprise an index trough which substantially surrounds the core and enables low-loss propagation of at least the lowest order fundamental mode in the core.

In various embodiments index troughs can be generated with surface modification at the core cladding interface resulting from one or more of the following: in-diffusion of contaminants, a selection of fiber drawing and/or fiber fusion temperature, exposure to processing gases, outside vapor deposition, or any other surface modifications.

In at least one embodiment auto-cladded fibers may be manufactured using a rod-in tube manufacturing technique.

In another embodiment auto-cladded fibers may be manufactured using a stack and draw technique. Various implementations of stack and draw fabrication can be used to pull fibers made from near identical rod materials or rod materials of different compositions arranged in a geometric pattern.

In some embodiments, the index profile of auto-cladded fibers can be tailored by using glasses with frozen-in index modifications due to, e.g., compositional and/or stress variations. The index profile of auto-cladded fibers can further be tailored using glasses with different stress-optic and/or thermo-optic coefficients. In at least one embodiment an all glass fiber may include a first cladding material having a first thermal expansion coefficient. The cladding may include a material having a second thermal expansion coefficient. The thermal expansion coefficients may further be selected, such that the thermal expansion of the cladding is higher than the core.

In an alternative embodiment additional cladding features are disposed in the first cladding material from a material having a third thermal expansion coefficient. The cladding features may be disposed in the first cladding material.

In some embodiments, the index profile can further be modified using thermo-optic effects.

In various embodiments auto-cladded fibers are used in large mode area single-core and multi-core amplifiers.

In an embodiment core-pumping may be implemented for the construction of efficient fiber amplifiers or lasers.

In another embodiment cladding-pumping may be implemented for the construction of efficient fiber amplifiers or lasers.

In an embodiment core-pumping in conjunction with diffractive beam splitters may be used for the construction of efficient fiber amplifiers and lasers.

In at least one embodiment auto-cladded or stress guided fiber preforms may be manufactured using core canes using a stack and draw technique or a rod in tube technique. At least some of the core canes have refractive index variations less than about $1 \times 10^{-5}$ across their cross section.

Any of the embodiments of optical fibers described herein may be used in an optical amplifier or laser.

DETAILED DESCRIPTION OF EMBODIMENTS

Figure 1A:
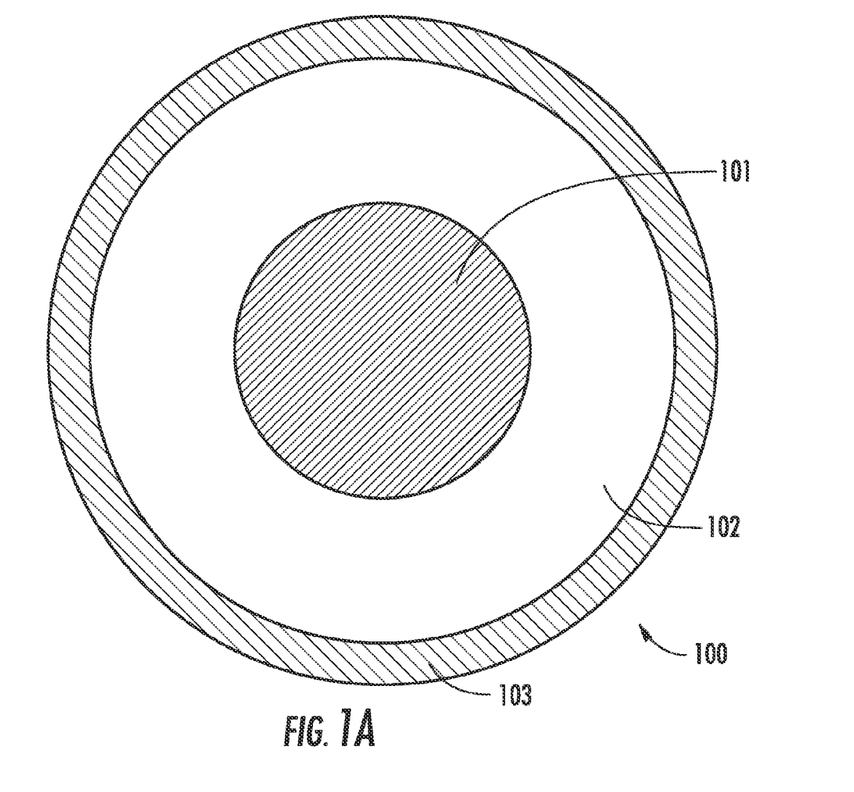
FIG. 1A schematically illustrates an embodiment of an auto-cladded single core fiber. In some embodiments, the fiber can be fabricated with a rod-in tube fabrication technique.

FIG. 1A illustrates a cross section of an embodiment of an auto-cladded fiber (ACF) 100. The ACF can be manufactured using standard fiber fabrication techniques, such as, for example, a rod-in-tube technique. The ACF has a core region 101 made of a core material, a first cladding region 102 made of a first material, and a second cladding region 103 made of a second material. In one implementation, the core material and the first material of the first cladding can be nearly identical, reducing or minimizing any index step between the core material and the first material. In some implementations, the core material and the first material of the first cladding region comprise near identical base glasses that can be purchased and/or manufactured in the form of canes, rods, tubes or boules. In some embodiments, these materials have refractive index variations less than about $5 \times 10^{-5}$ across their cross section. The manufacturing of optical fibers with such small index variations across their core by conventional methods (such as modified chemical vapor deposition) is difficult, as stated in L. Fu et al., "EXTREMELY LARGE MODE AREA OPTICAL FIBERS FORMED BY THERMAL STRESS," Opt. Expr., vol. 17, pp. 11782 (2009). The second material of the second cladding region 103 may be substantially the same as, or different from, the core material and/or the first material of the first cladding 102. Additional outside claddings optionally may be included for fiber protection (not shown in FIG. 1A).

Embodiments of the rod in tube fabrication method provide that a hole is drilled into one cane, into which the core rod is fitted. Alternatively, a rod can be fitted into a tubular substrate. In order to reduce or avoid imperfections and bubble formation at the core/cladding interface, optical polishing of both the inside of the cladding material and the outside of the core rod can be performed in some cases. A fiber is then formed when pulling the structure at an elevated temperature.

In some implementations, to produce a guiding structure, a small index trough can be provided at the core/cladding interface (e.g., at the interface between the core region 101 and the first cladding region 102 in the embodiment of the fiber 100 shown in FIG. 1A). In this disclosure, the small index trough may sometimes be referred to as an example of an auto-cladding. In this disclosure, wave-guiding in the fiber based at least in part on an auto-cladding is sometimes referred to as auto-guiding.

In some embodiments, the auto-cladding can arise from surface modifications due to one or more of the following: exposure to ambient atmosphere at ambient or elevated temperatures, exposure to processing gases such as Argon (Ar), outside vapor deposition, additional in-diffusion of contaminants while subjecting the glasses to an immersion in a liquid bath, and thermal stresses. The size (e.g., a radial extent) and/or the depth (e.g., a refractive index difference) of the auto-cladding can also be controlled.

In an implementation, the manufacturing of an auto-cladded fiber based on a rod-in tube technique fiber can comprise the following: 1) assembling a precursor to a fiber preform comprising a structure comprising a core cane fitted into a tubular cladding material. The structure can be fitted into a tubular substrate with reduced refractive index; 2) fusing the precursor at an elevated temperature, preferably at reduced pressure in an optical processing gas atmosphere to reduce or eliminate bubbles in the fused structure, thereby creating a fiber preform; and 3) drawing the fiber preform into a fiber. In some implementations, the central fiber cane can have index variations less than about $5 \times 10^{-5}$ across its cross section and can be doped with a rare-earth material. After drawing, embodiments of the fiber can support fundamental mode operation with a mode diameter between about 50 µm to about 500 µm, depending at least in part on core size. In some embodiments of the manufacturing process, a surface trough in refractive index occurs at the core surface. Optionally one or more additional manufacturing steps can be introduced to enhance the core surface trough (e.g., to increase the radial extent of and/or the refractive index difference).

Figure 1B:
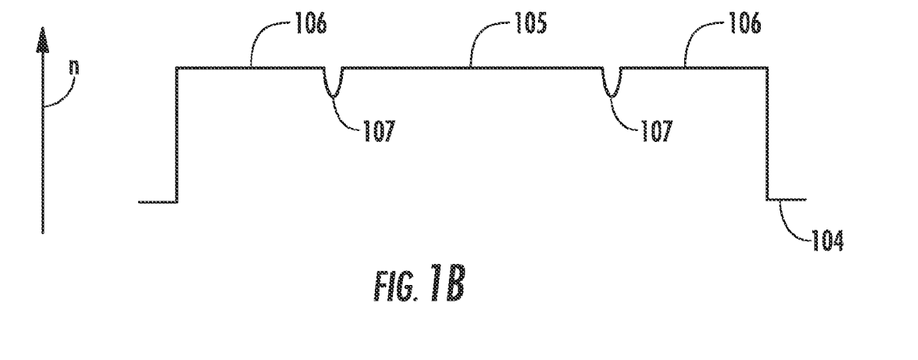
FIG. 1B schematically illustrates the refractive index profile across a diameter of an embodiment of an auto-cladded single-core fiber. In this embodiment, auto-cladding features include a trough in refractive index at an interface between the core and cladding of the fiber.

FIG. 1B schematically illustrates an example of a refractive index (n) profile 104 that can be obtained for some embodiments of the fiber 100. In this example, the core material 105 has a refractive index $n_{co}$ and the cladding material 106 has a refractive index $n_{cl}$, where the refractive index of the core material and the cladding material are nearly identical. For example, the refractive index difference between the core material and the cladding material may be less than about $5 \times 10^{-5}$. The boundary between the core material and the cladding material has a slight index trough 107, which is an example of an auto-cladding. The index trough substantially surrounds the core 101 in this example. The index trough can comprise an index depression less than about $1 \times 10^{-4}$ in some embodiments. The index trough can comprise an index depression less than about $5 \times 10^{-5}$ in some embodiments. The index trough can comprise an index depression that is approximately $1 \times 10^{-5}$ in some embodiments. The index trough can have a width of about 1 µm up to about 50 µm in some embodiments. Other values of for the index depression and/or auto-cladding width are used in other embodiments. The shape of the index trough may be different than shown in FIG. 1B, in other embodiments. The auto-cladding (e.g., an index trough) can be configured to be sufficient to provide relatively low-loss propagation of at least the lowest order mode in the core.

Figure 1C:
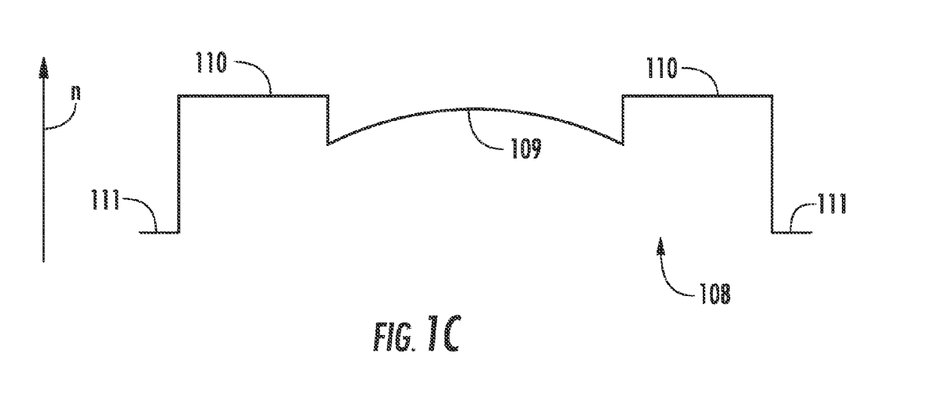
FIG. 1C schematically illustrates the refractive index profile in an embodiment of an auto-cladded single-core fiber in the presence of stress variations inside the core.

In some embodiments, due to compositional and/or stress variations in the base glasses, particularly in the core material, additional index variations can occur (other than the example index trough shown in FIG. 1B), which can further modify the waveguiding properties of the structure. In addition, index gradients can be impressed on the structure from thermal stresses during fiber fabrication and/or fiber drawing. For example, while cooling, the fiber cools from the outside to the inside. For a material with a positive thermal expansion coefficient such as silica glass, the outside layers of the fiber contract during cooling and stress the inside of the fiber, thereby inducing a stress gradient in the inside of the fiber during the cooling process. An example of a waveguiding index structure 108 with a central index gradient is schematically shown in FIG. 1C. The waveguiding index structure 108 may exhibit a maximum at about the center of the core and that may decrease from the center to the edge of the core. Examples of such a refractive index structure are also discussed in International Pub. No. WO 2009/042347. In the example schematically shown in FIG. 1C, the core refractive index 109 increases towards the center of the fiber, whereas the index of the cladding 110 can be higher (as shown in FIG. 1C) or lower (not shown) than the index in at least a portion of the core. In the example shown in FIG. 1C, a second cladding with an index 111 substantially surrounds the fiber core and cladding. Fibers with weak index gradients inside the core are sometimes referred to as stress guided fibers in this application and in the publication WO2009/042347. In some embodiments, the index gradients produce an index differential of the order of about $10^{-4}$. The index gradients can provide a numerical aperture for the fundamental mode of less than about 0.02 in some cases. Other index differentials and numerical apertures are possible.

In other embodiments, the index structure in the core can be different from the core index structure 109 schematically illustrated in FIG. 1C, for example, having a different shape, radial profile, amount of index depression relative to the cladding 110, and so forth. Also, in some embodiments, one or more auto-cladding features (e.g., index troughs) can be included in the fiber in addition to index structure in the core.

In some embodiments, stress guiding can be induced by selecting a core material and a cladding material with different thermal expansion coefficients. For example, an index increase in the core region can be obtained in some cases when selecting a core material with a lower thermal expansion coefficient compared to the cladding material. Depending (at least in part) on the thermal expansion coefficients of the glasses and/or frozen-in stresses inside the fiber core (and/or cladding), stress guiding can dominate over auto-guiding in some embodiments.

Auto-guiding and/or stress guiding can be implemented for fundamental mode operation of optical fibers with core diameters, for example, in the range of about 20 µm to about 500 µm. Fibers with core diameters in a range from about 50 µm to about 500 µm are sometimes referred to herein as large core fibers. For example, for fundamental mode operation in a core with a diameter of about 150 µm, the refractive index step between core and cladding and/or between core and an index trough is of the order of about $10^{-5}$ in some cases.

Such small index differences are generally difficult to obtain using conventional fiber fabrication techniques such as modified chemical vapor deposition or micro-structuring, as discussed in Fu et al. In contrast even small surface modifications of the core and cladding materials, small differences in thermal expansion coefficients between core and cladding material and/or frozen in stresses due to non-uniform cooling can generate such index increases in the center of the core.

Auto-guiding and/or stress guiding in some embodiments of large core optical fibers does not require any particular value for the refractive index of the cladding. In some embodiments, the index troughs due to auto-guiding are less than about $10^{-4}$. In some embodiments, the index differential due to stress guiding is less than about $10^{-4}$. In some embodiments, the index troughs due to auto-guiding are less than about $5 \times 10^{-5}$. In some embodiments, the index differential due to stress guiding is less than about $5 \times 10^{-5}$. In some embodiments, the refractive index of the core and the cladding are closely matched in order to simplify excitation of the fundamental mode in the auto-guided and/or stress guided structure. In some embodiments, closely matched core and cladding materials can have an index difference less than about $10^{-4}$, less than about $5 \times 10^{-5}$, or approximately $10^{-5}$. However, the index of the cladding can be lower or higher than the refractive index in at least a portion of the core (e.g., as shown in the example of FIG. 1C). When the index of the cladding is higher, the cladding, in some cases, can help dissipate higher-order modes away from the core region. In contrast to index-anti-guiding fibers as proposed in U.S. Patent Application Pub. No. 2008/0198879, in some embodiments of the fiber disclosed herein, the fundamental mode can propagate through the core region with reduced or minimal propagation losses even for small index differences between core and cladding or small index gradients across the core.

It is believed (although not required) that low loss propagation arises from the fact that index gradients in such large core fibers, e.g. in fibers with core diameters in the range from about 50 µm to about 500 µm, lead to a confinement of the fundamental mode away from the core/cladding interface. Confinement of the fundamental mode may be measured by, e.g., an effective mode area of the fundamental mode. Definitions of the effective mode area of optical fibers are well known in the state of the art and are not repeated here. The fundamental mode area A of conventional step index fibers with a core diameter d is generally $A > \pi d^2/2$. In some embodiments of the large core fibers with internal index gradients, the fundamental mode area may satisfy $A < \pi d^2/2$, where the core diameter d is determined as the diameter of the core/cladding interface or the diameter of an index trough substantially surrounding a core region, for example.

To enable gain in auto-guided and/or stress guided fibers, the central core region advantageously may comprise a dopant such as, e.g., a rare-earth-doped core material. Such core materials can be readily made from low melting temperature glasses (e.g., glasses with a melting temperature less than 1500° C.) such as, e.g., phosphate glasses by, for example, melting such glasses in a crucible. Another example of a method for the fabrication of a doped core material can be sintering, as recently described in Langner et al., "COMPARISON OF SILICA BASED MATERIALS AND FIBERS IN SIDE AND END-PUMPED FIBER LASERS", Proceeding of Photonics West, paper 7195-25 (2009) and also German patent application DE102007045097A1. Sintering has advantages that it is compatible with silica glass manufacturing methods and that substantially uniform rare-earth doped glasses can be made. For increased or optimum structural stability, silica glass fibers may be preferable over low melting temperature glasses. However, other methods for the manufacturing of highly uniform doped core materials, such as outside chemical vapor deposition as known in the state of the art are also possible. Rare-earth dopants such as, e.g., Yb, Nd, Er, Er/Yb and/or Tm, can be readily incorporated into the glass matrix. A doped glass can then be readily incorporated instead of core 101 in the example shown in FIG. 1A using, for example, conventional rod-in tube manufacturing.

In some techniques, a highly controllable index trough can be incorporated via plasma outside deposition on the surface of a doped rod preform, as described by Langner et al. The modified fiber rod preform can then be inserted into a silica glass sleeve and fused at high temperature. Alternatively, both the core and/or the cladding can comprise rare-earth doped materials. Many variations are possible, and the foregoing are merely examples.

In some implementations, it may advantageous to pump the core region with a high power near-diffraction limited laser. When core-pumping, rare-earth-doped glasses can be implemented for both core and cladding without substantial loss of amplifier efficiency. Since both cladding and core can be rare-earth doped, nearly identical glasses can be implemented for core and cladding in some embodiments, enabling precise control of the index step between core and cladding. Selection of closely index matched core and cladding material is one of the problems limiting the scaling of core area in conventional leakage channel and photonic crystal or microstructured fibers. However, the use of auto-guiding and/or stress-guiding in some fiber embodiments has the additional advantage that precise index matching between core and cladding is not required.

Figure 2:
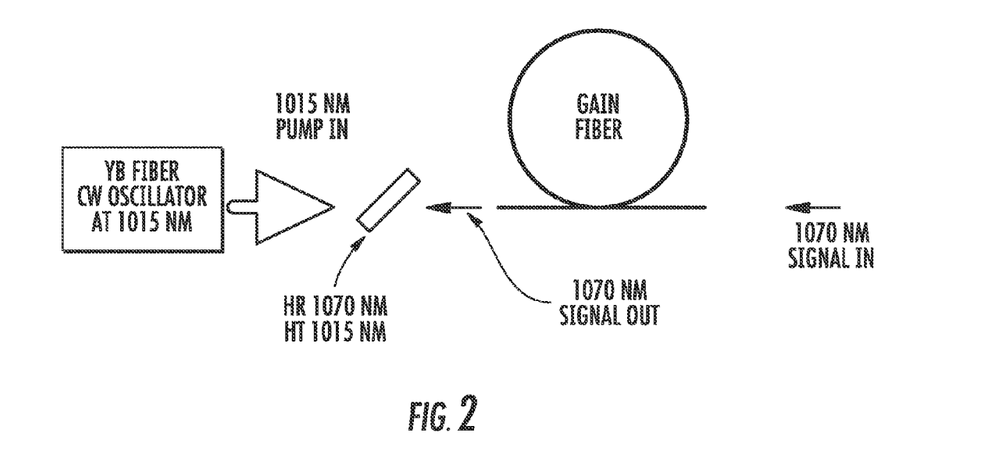
FIG. 2 demonstrates an example of an optical pumping arrangement that can be implemented for an auto-cladded fiber.

An example of an optical pumping arrangement for auto-guided and/or stress guided fiber amplifiers (e.g., Yb doped fiber amplifiers) is schematically shown in FIG. 2. A cladding-pumped Yb fiber laser is configured to generate continuous wave (cw) output for a wavelength in the range from about 970 nm to about 1020 nm. Examples of such a pumping arrangement are discussed in U.S. patent application Ser. No. 12/630,550, which is incorporated by reference herein for the material specifically referred to herein and for all other material that it discloses. In some embodiments, heavily phosphate doped Yb silica glass fibers (e.g., as discussed in U.S. patent application Ser. No. 12/630,550, which is incorporated by reference herein for the material specifically referred to herein and for all other material that it discloses) can be implemented to generate the pump wavelength. In other embodiments, other Yb fibers can be implemented additionally or alternatively. In some embodiments, since the size of the fundamental auto-guided and/or stress guided mode is only weakly wavelength dependent, the pump light and the signal light can both be injected into the core of the fiber using appropriate mode-matching optics. Using pump wavelengths in the range from about 970 nm to about 1020 nm, signal amplification at wavelengths between about 1030 nm to about 1150 nm can be obtained, where a dichroic beam splitter may be used to separate the signal and pump wavelengths. For some embodiments of a counter-directional orientation of pump and signal, the dichroic beam splitter can be designed to pass the pump wavelength and to reflect the signal wavelength. For example, in the embodiment shown in FIG. 2, the dichroic beamsplitter transmits light at 1015 nm (HT 1015 NM) and reflects light at 1070 nm (HR 1070 NM). However, co-propagating orientations of pump and signal can also be utilized (such an implementation is not separately shown).

Instead of (or in addition to) Yb dopants, any other rare-earth dopants such as, e.g., Nd, Er, Er/Yb and/or Tm can also be implemented in the construction of auto-guided and/or stress-guided fiber amplifiers. Also the fiber pump source and the amplifier can be selected from different rare-earth ions, for example an Yb fiber pump can be used to pump an Er/Yb fiber amplifier.

Instead of direct core-pumping, cladding pumping with broad area diode lasers can also be implemented. Such an implementation is not separately shown.

Figure 3:
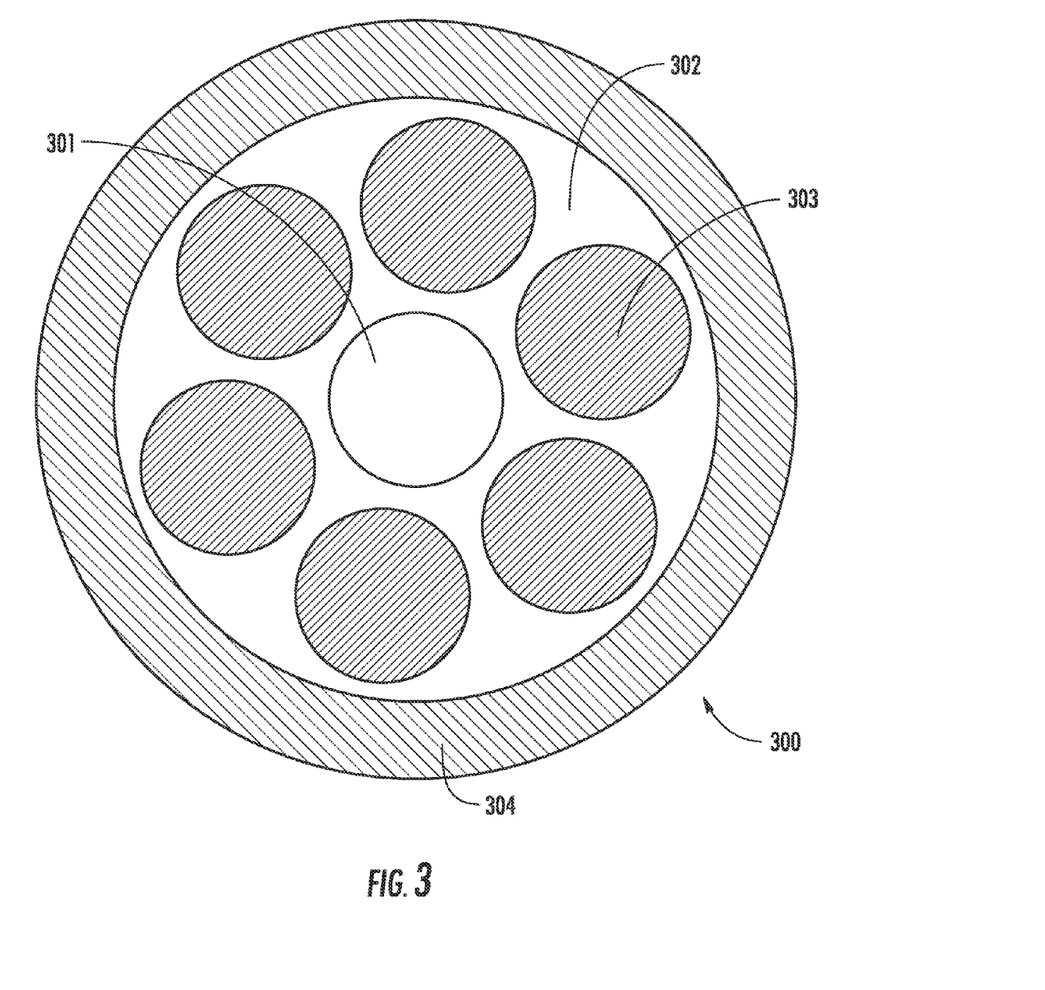
FIG. 3 schematically illustrates an embodiment of an auto-cladded single core fiber comprising additional leakage channels.

Auto-guiding and/or stress guiding may also be compatible with thermal guiding and/or with leakage channels. For example, thermal guiding arises at appreciable heat dissipation inside the fiber core, which for a material with a positive thermo-optic coefficient produces an increase in the core refractive index. In some implementations, for core diameters greater than about 100 µm, the mode size can be appreciably reduced at high power levels, which in turn can improve the guiding characteristics of the fundamental mode. In contrast, in solid-state amplifiers such thermal effects typically limit the mode-quality of high power amplifiers Examples of the combination of leakage channels or leakage channel fibers (LCFs) with stress guiding are described in International Pub. No. WO2009/042347. An example of an ACF with additional leakage channels is schematically shown in FIG. 3. Here the ACF 300 is constructed with core material 301 and cladding material 302. The core material and cladding material are selected to be nearly identical or have at least closely matched refractive indices (for example, with index differences less than about $10^{-4}$, less than about $5\times10^{-5}$, or lower). The ACF further includes leakage channels 303 with a lower refractive index compared to the core material. In some embodiments, the thermal expansion coefficient of the leakage channel material 303 may be higher than the thermal expansion coefficient for the core material 301. Such leakage channel rods can be incorporated into the cladding 302, for example, by drilling appropriate holes into the cladding.

In some embodiments the fiber 300 comprises for example a rare-earth-doped silicate glass core 301, a rare-earth doped or undoped cladding 302, and six fluorosilicate leakage channels 303. In other embodiments, a different number of leakage channels 303 can be used. The fiber further optionally includes an outside cladding 304. Additional outside claddings may be included for fiber protection (not shown in FIG. 3). In some fibers that do not include stress or an auto-cladding, a standard leakage channel fiber (e.g., as described in Int. Pub. No. WO 2009/042347) is obtained, where fundamental mode propagation is favored over higher-order mode propagation due to the lower confinement loss of the fundamental mode relative to at least some of the higher-order modes. As discussed in WO 2009/042347, the inclusion of stress may increase the refractive index inside the core, enabling additional confinement and index guiding for the fundamental mode. Such stress guiding can occur even without an interface between the core and cladding materials 301 and 302. In the presence of an auto-cladding, the leakage channels 303 can reduce the transmission loss of the fundamental mode relative to at least some higher-order modes in certain fiber embodiments.

In one possible implementation, the structure as shown in FIG. 3 can be manufactured using a stack and draw technique comprising the following: 1) assembling a precursor to a fiber preform comprising a structure comprising a core cane at least partially surrounded by a number of cladding canes (e.g., arranged around the circumference of the core). In some cases, the cladding canes are arranged in close proximity to the core cane and with each other (e.g., close-packing). This structure can be fitted into a tubular substrate with optionally reduced refractive index. 2) Fusing the precursor at an elevated temperature, preferably at reduced pressure at an optical processing gas atmosphere in order to reduce or eliminate bubbles in the fused structure, thereby creating a fiber preform; and 3) drawing the fiber preform into a fiber. The central fiber cane (and/or other canes) may have index variations less than about $5\times10^{-5}$ across its cross section and can be doped with a rare-earth material. In some embodiments, leakage channels 303 of the fiber 300 may be formed at least in part from low index leakage channel rods comprising a composite material having an inner core and a cladding surrounding the core (not shown). If a stack and draw fabrication process is utilized, the cladding material 302 may come from the cladding canes and/or the low index leakage channel rods. If fabrication is carried out with a drilling process, the cladding material 302 may be formed at least in part from the host glass material in which holes are drilled for the low index leakage channel rods. After drawing, certain embodiments of the fiber 300 can support fundamental mode operation with a mode diameter between about 50 µm to about 500 µm, depending at least in part on core size. Fundamental mode operation may be facilitated via auto-guiding and/or stress guiding from surface troughs and/or an index gradient respectively.

A surface trough can occur at the core surface in the manufacturing process. Optionally one or more additional manufacturing steps can be introduced to enhance the core surface trough. In some embodiments, as an alternative to (or in addition to) uniform cladding canes, two-section cladding canes with at least a central section doped with material with a higher stress optic coefficient compared to the core material can be implemented. When using silica fibers, a rare-earth doped uniform silica cane can be implemented. In some embodiments, the cladding canes can be based on pure silica with a central fluoro-silicate and/or boro-silicate section. Additional sleeveing can be implemented to increase the diameter of the fiber. Other types of canes can be used in other embodiments.

A rod-in tube process can be implemented for making the structure shown in FIG. 3, where drilling and polishing is used to fit the core cane 301 and the cladding canes 303 into a large cladding tube 302.

Embodiments of the stack and draw fabrication method for ACFs and stress-guided fibers (SGFs) is further described with reference to FIG. 4. In the example shown in FIG. 4, a preform 400 comprises the core material 401 and the cladding material 402, which are made from near identical glass canes, which are embedded into a sleeve 403. The core and/or the cladding material can be doped, for example, with rare-earth elements such as, e.g., Nd, Yb, Er and/or Tm in order to produce gain during optical pumping. In some embodiments, only the core material is rare-earth doped and silica glass rods can be used for the cladding material 402. Many variations are possible. Methods of manufacturing such doped glasses with substantially high uniformity based on sintering were described by Langner et al. The preform structure can be fused and drawn into a fiber using a processing gas such as, e.g., Argon or Nitrogen. Surface effects and/or frozen in stress can produce index troughs at the interfaces between the glass canes as well as positive index gradients towards at least the center of the central cane in some embodiments. Such frozen in stress may be irreversible in some implementations. For example, stress associated with thermal expansion may not be relievable, at least with some conventional methods. However, if desired, drawing induced stress may be relieved at least in part with annealing at sufficiently high temperatures. These effects can be sufficient to allow index guiding of pump and/or signal light in the central fiber cane.

In some embodiments, the core glass cane 401 and the cladding glass canes 402 can be selected from materials with different thermal expansion coefficients in order to enhance stress guiding in the central cane.

Figure 5:
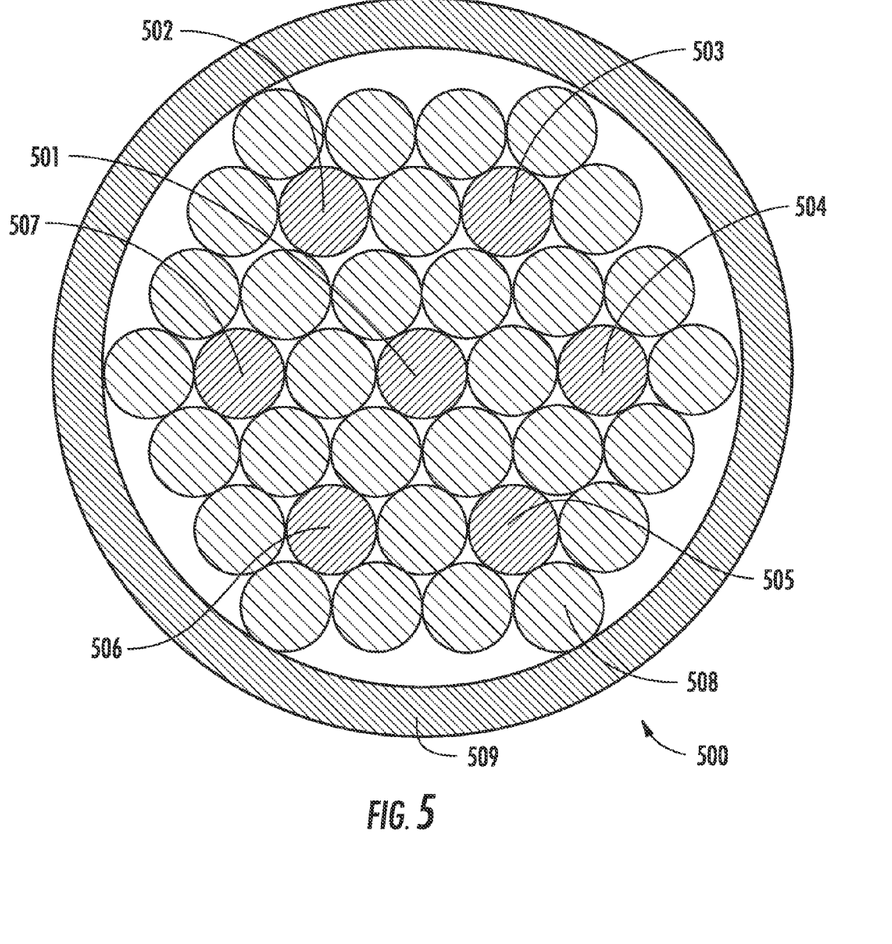
FIG. 5 schematically illustrates an example of a preform that can be used during construction of an example of an auto-cladded multi-core fiber fabricated with a stack and draw fabrication technique.

The stack and draw fabrication method can also be extended to the manufacture of multi-core optical fibers as schematically shown in FIG. 5. In the illustrated example, a preform 500 for a multi-core fiber with seven cores formed from core canes 501-507 is schematically shown. The cladding material is produced from a total of 30 canes 508. In other embodiments, a different number of core canes and/or cladding canes can be used. For example, tens or hundreds of cores can be fabricated for various embodiments of multi-core optical fibers. In some embodiments of fiber fabrication, the core and cladding canes are inserted into sleeve 509 and drawn under an elevated temperature under weak vacuum conditions in the presence of a processing gas in order to reduce or eliminate the interstitial spaces inside the fiber. In one embodiment, the cladding canes can be selected with higher thermal expansion coefficients than at least some of the core canes in order to enhance stress guiding within the fiber cores. Auto-guiding in the fiber cores can also be induced using surface modifications of at least some of the core and/or cladding canes. Some or all of the core and/or the cladding materials can be substantially uniformly doped (e.g., with rare-earth ions) in order to obtain gain when optically pumping the fiber cores. In some fabrication methods, a fiber generally similar in appearance to that schematically illustrated in FIG. 3 may result from fabrication using embodiments of the preform 500. An index profile of one or more of the fiber cores may be tailored similar to the examples illustrated in FIG. 1B and/or FIG. 1C, the latter of which can result at least in part from stress induced in the core.

In an alternative embodiment, some or all of the canes (e.g., some or all of the 37 canes shown in the example in FIG. 5) can be made from substantially identical materials and a waveguiding core structure can be produced using auto-guiding and/or stress guiding effects. Note that the construction of a stress-guided and/or auto-guided multi-core fiber may be simpler and may use a smaller number of canes compared to certain embodiments of a multi-core fiber based on leakage channel fibers, as discussed in U.S. Patent Application Publication No. US 2009/0201575 to Fermann et al.

Figure 6:
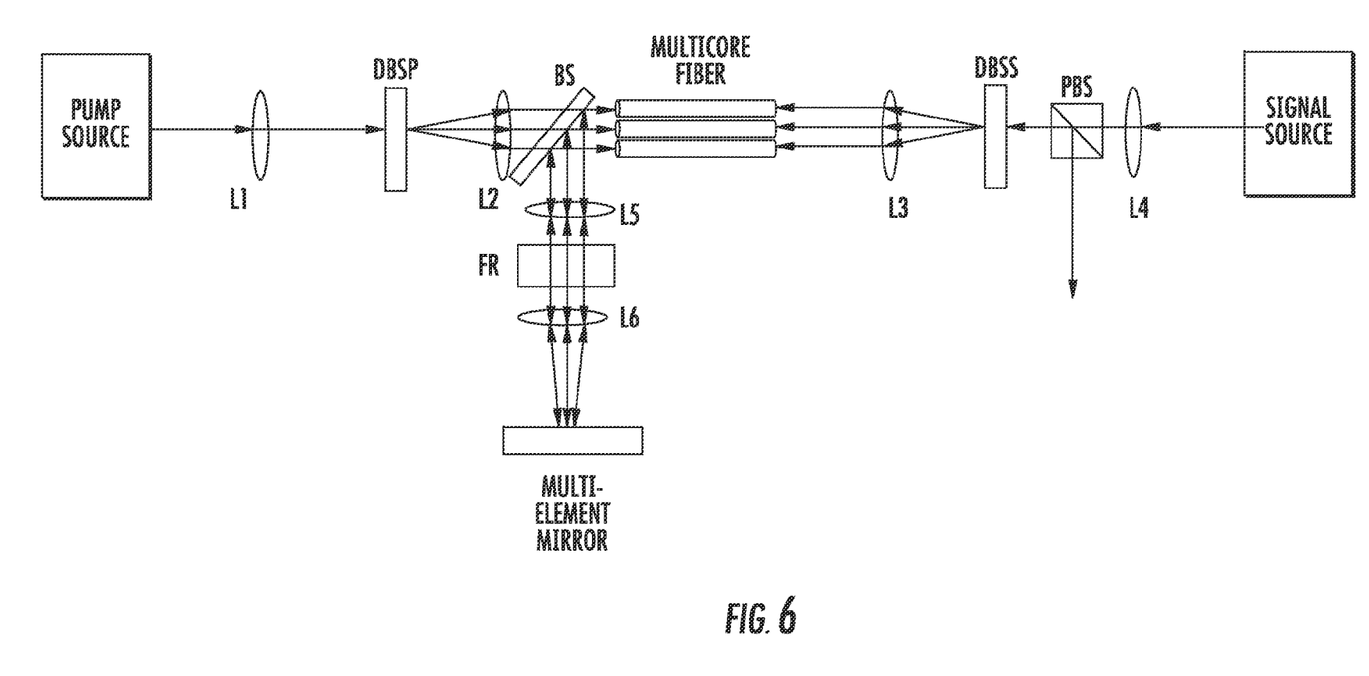
FIG. 6 schematically illustrates an example of an optical pumping arrangement for an embodiment of an auto-cladded multi-core fiber.

In some implementations, multi-core auto-guided and/or stress guided fibers can be conveniently core pumped using a single near diffraction limited source, which is directed into some or all individual cores by a diffractive beamsplitter as shown in an embodiment schematically depicted in FIG. 6. Additionally or alternatively, examples of cladding pumping as described in U.S. Patent Application Publication No. 2009/0201575 can be implemented. In the case of core pumping, the example in FIG. 6 shows a near diffraction limited pump source is coupled via an imaging system comprising lenses L1 and L2 and diffractive beam-splitter DBSP into some or all of the individual cores of the multicore fiber. In some embodiments, the fundamental mode size of the pump source and the individual cores of the multi-core fiber can be matched, allowing near diffraction-limited imaging of the pump source into some or all of the cores of the multicore fibers using substantially identical lenses in an f-f-f-f configuration, as well known in the state of the art, where the DBSP is located substantially in the center of the imaging arrangement.

Any of the embodiments of multi-core fiber described herein may be used with the example optical pumping arrangement schematically shown in FIG. 6. In some implementations, the optical pumping arrangement of FIG. 6 may be used with single-core fiber. In the example illustrated in FIG. 6, a multi-core optical fiber comprising three cores is shown, but multi-core fibers with two, five, seven, tens, or even hundreds of cores can be used. Continuing with this example implementation, the near-diffraction limited signal source is coupled to the other end of the multicore fiber via lenses L3 and L4 and a second diffractive beam splitter DBSS, where a similar f-f-f-f configuration can be implemented in some embodiments. After the first pass through the multicore fiber, the signal light is imaged via lenses L5 and L6 onto a multi-element mirror, e.g., for determining piston phase, angular and/or intensity control. Examples of such multi-element mirrors and techniques for their control are described in U.S. Patent Application Pub. No. 2009/0201575. In some embodiments, inclusion of a Faraday rotator FR further provides that the output after the second pass through the multi-core amplifier is obtained in a linear polarization state, where the output is coupled out from the system via polarization beam splitter PBS. Instead of (or in addition to) imaging systems based on lenses, imaging systems based on dielectrically coated mirrors can also be used, particularly for ultra-high power operation.

ADDITIONAL EXAMPLES AND EMBODIMENTS

An embodiment of an all-glass fiber comprising a core and cladding material is provided. The core and cladding material comprise an interface, and the core and cladding material are selected from substantially identical glasses. The fiber can be configured to support low-loss propagation of at least the lowest-order core mode. The fiber may comprise at least one of an index trough at the core-cladding interface and an index gradient within the core.

The core and/or the cladding material can be doped with a rare-earth material. Rare-earth dopants can include, e.g., Yb, Nd, Er, Er/Yb, Tm, and/or combinations thereof. Doped material can be formed by sintering.

The core and/or the cladding material can comprise a silicate glass. The core and/or the cladding material can comprise a borosilicate glass and/or a phosphosilicate glass. The core and/or cladding material can comprise a phosphate glass. The core and/or cladding material can comprise glasses with a melting temperature less than about 1500° C.

The fiber core can have a diameter in a range from about 50 µm to about 500 µm. The fiber can be configured as a large core or an ultra-large core optical fiber.

The fiber can further be configured as an optical amplifier, the amplifier comprising a near diffraction-limited pump source coupled into the fiber core.

The fiber can comprise an index trough at the core-cladding interface. The index trough can comprise an index differential less than about $10^{-4}$. The index trough can have a width in a range from about 1 µm to about 50 µm. The index trough can substantially surround the core.

A refractive index difference between the core material and the cladding material in the fiber can be less than about $10^{-4}$. The refractive index difference can be less than about $5 \times 10^{-5}$.

The fiber core can further comprise an index gradient inside the core with a maximum index differential of about $10^{-4}$ inside the core. The index gradient can arise from frozen-in stresses inside the core. The index gradient can arise from compositional variations inside the core.

The cladding material can further include additional features disposed within the cladding. The features can comprise a glass made of a different material than the cladding material and/or the core material. The cladding material can have a higher thermal expansion coefficient than the core material. The cladding material may comprise one or more leakage channels.

The fiber can comprise an auto-cladding feature. The auto-cladding feature can comprise an index trough. The fiber can comprise an all-glass fiber. The fiber can comprise an auto-cladding feature at the core-cladding interface. The auto-cladding feature can comprise an index differential relative to surrounding material that is less than about $10^{-4}$. The auto-cladding feature can have a width (e.g., a radial extent) in a range from about 1 µm to about 50 µm.

A fiber can comprise a first material, a second material, and an auto-cladding between the first material and the second material. In some embodiments, the first material and the second material are substantially identical. The refractive index difference between the first material and the second material can be less than about $10^{-4}$ less than about $5\times10^{-5}$, or some other value. The auto-cladding may have a refractive index difference from the first material, the second material, or both that can be less than about $10^{-4}$, less than about $5\times10^{-5}$, or some other value. In various embodiments, the first material, the second material, or both materials are doped with a rare-earth dopant including one or more of Yb, Er, Nd, or Tm.

Another embodiment of an all-glass fiber comprises a core and cladding material. The core and cladding material can have an interface. The core and cladding material can be selected from glasses with an index differential less than about $10^{-4}$. The fiber can comprise an index trough at the core-cladding interface or that substantially surrounds the core.

The glass fiber further can comprise a rare-earth dopant inside the core and/or the cladding material.

The fiber core further can comprise an index gradient inside the core with a maximum index differential of about $10^{-4}$ inside the core. The index gradient can arise from frozen-in stresses inside the core.

The fiber core further can comprise an index gradient inside the core resulting from a non-uniform heat distribution within the fiber core.

Embodiments of a fiber amplifier can comprise any of the embodiments of the all-glass disclosed herein. The fiber amplifier can be cladding pumped and/or core pumped.

Embodiments of an all-glass fiber amplifier can comprise a fiber comprising a rare-earth doped core and cladding material, and a near diffraction-limited pump source coupled into the rare-earth doped core. The fiber core can be configured to amplify at least the lowest-order core mode. The fiber may further comprise an index trough at the core-cladding interface or an index gradient within the core.

In various embodiments of the fiber amplifier, the rare-earth doping level in the core and cladding can be substantially the same, with an index difference, for example an index trough, sufficiently large such that the fiber amplifier amplifies and guides at least the lowest-order mode. The core and cladding material can be selected with different thermal expansion coefficients. The thermal expansion coefficient of the cladding can be selected to be higher than the thermal expansion coefficient of the core.

In various embodiments of the fiber amplifier, the fiber can comprise an index trough at an interface between the core and the cladding.

In various embodiments of the fiber amplifier, the fiber core can comprise an index gradient inside the core with a maximum index differential of about $10^{-4}$ inside the core. The index gradient can arise from frozen-in stresses inside the core. The index gradient can arise from compositional variations inside the core. In some embodiments the core will have a dimension, for example maximum diameter, at least about 20 µm. An index profile within the core may exhibit a maximum at about the center of the core, and decrease from the center to the edge of the core. An index of a cladding substantially surrounding the core can be higher or lower than the index in at least a portion of the core.

In various embodiments of the fiber amplifier, the cladding material can include additional features disposed within the cladding. The features can comprise a glass made of a different material than the core material and/or the cladding material. The cladding material can have a higher thermal expansion coefficient than the core material.

Embodiments of an all-glass fiber comprise a core and cladding material. The core and cladding material can have a common interface. The core material can have a diameter d with d having a value between about 50-500 µm. The core material can be configured to support at least low-loss propagation of the fundamental mode. The fundamental mode can have an effective mode area A less than about $\pi d^2/2$.

The core material can be doped with a rare-earth material.

The fiber can comprise an index trough at the core-cladding interface.

The fiber core further can comprise an index gradient inside the core with a maximum index differential of about $10^{-4}$ inside the core. The index gradient can arise from frozen-in stresses inside the core. The index gradient can arise from compositional variations inside the core.

The cladding material can include additional features disposed within the cladding. The features can comprise a glass made of a different material than the core and/or the cladding. The cladding material can have a higher thermal expansion coefficient than the core material.

Embodiments of any of the fibers disclosed herein can be configured as an optical amplifier. The amplifier can be core pumped and/or cladding pumped. In any of the embodiments of all-glass fibers disclosed herein, the fiber can be configured to comprise multiple cores. The number of multiple cores can be a few (e.g., between 2 and 10), about ten, about several tens, about a hundred, about several hundreds, or more. One, some, or all of the multiple cores may have an index trough at the core-cladding interface or an index gradient within the core.

Any of the embodiments of multi-core fiber disclosed herein can be configured to be cladding pumped and/or core pumped.

Embodiments comprising multi-core fiber can further comprise an apparatus configured to adjust phase between the multiple cores. The apparatus can comprise a multi-element mirror.

An embodiment of a multi-core fiber amplifier comprising a fiber comprising multiple cores is provided. The amplifier further comprises an optical pump source and an optical signal source. The optical pump source can be configured to deliver light into at least some of the multiple cores via a diffractive beam splitter.

An embodiment of a silica-glass fiber drawn from a fiber preform is provided. The fiber preform can be constructed from a silica core and cladding material precursors. The core precursor can be rare-earth doped. The core precursor can have index variations less than about $5\times10^{-5}$ across its cross section. The core and cladding material can have a common interface. The fiber can be configured to support fundamental mode amplification with a mode diameter greater than about 50 µm.

An embodiment of a method of making a fiber supporting fundamental mode operation with a mode diameter between about 50 µm to about 500 µm is provided. The method comprises assembling a precursor to a fiber preform comprising canes of silica glass core and silica glass cladding material. The cladding canes can be arranged along an outside circumference of the core. At least a portion of the core material can be rare earth doped. In some cases, at least a portion of the cladding canes are rare earth doped. The core cane can have a refractive index variation less than about $5\times10^{-5}$ across its cross section. The core cane can be further subjected to an optional surface treatment. The surface treatment can be selected to provide an index trough with an index depression less than about $10^{-4}$ after the fiber is drawn. The cladding canes can comprise optional central sections of boro-silicate and/or fluoro-silicate glass.

The method further includes inserting the core and cladding canes into a substrate tube and fusing the core and cladding canes and the substrate tube at an elevated temperature so as to reduce or eliminate interstitial spaces between the precursor materials. The fusion process can result in a substantially solid fiber preform. The method further includes drawing a fiber from the fiber preform.

An embodiment of a method of making a fiber supporting fundamental mode operation with a mode diameter between about 50 µm to about 500 µm is provided. The method comprises assembling a precursor to a fiber preform comprising a silica glass core cane and a silica glass cladding tube. The cladding tube comprises a central hole. At least a portion of the core material can be rare earth doped. In some cases, at least a portion of the cladding canes are rare earth doped. The core cane can have a refractive index variation less than about $5\times10^{-5}$ across its cross section. The core cane can be further subjected to an optional surface treatment. The surface treatment can be selected to provide an index trough with an index depression at least about $10^{-6}$ and less than about $10^{-4}$ after the fiber is drawn. The cladding canes can comprise optional central sections of boro-silicate and/or fluoro-silicate glass.

The method also includes fitting the core cane into the central hole in the cladding tube and fusing the core and cladding canes and the substrate tube at an elevated temperature so as to reduce or eliminate interstitial spaces between the precursor materials. The fusion process provides a solid fiber preform. The method also includes drawing a fiber from the fiber preform.

An embodiment of a method of making a multi-core fiber supporting fundamental mode operation with a mode diameter between 50 µm to about 500 µm in each core is provided. The method comprises assembling a precursor to a fiber preform comprising canes of silica glass core and silica glass cladding material. The cladding canes can be arranged along the outside circumference of the cores. The cladding canes can further comprise optional central sections of boro-silicate and/or fluoro-silicate glass. At least a portion of the core material can be rare earth doped. In some cases, at least a portion of the cladding canes are rare earth doped. The core cane can have a refractive index variation less than about $5\times10^{-5}$ across its cross section. The core cane can be further subjected to an optional surface treatment. The surface treatment can be selected to provide an index trough with an index depression less than about $10^{-4}$ after the fiber is drawn.

The method further includes inserting the core and cladding canes into a substrate tube and fusing the core and cladding canes and the substrate tube at an elevated temperature so as to reduce or eliminate interstitial spaces between the precursor materials. The fusion process results in a solid fiber preform. The method also includes drawing a fiber from the fiber preform.

Various embodiments of a fiber can be formed by any one of the methods described herein.

An embodiment of a silica-glass fiber drawn from a fiber preform is provided. The fiber preform can be constructed from a silica core and cladding material precursors. The core precursor can be rare-earth doped. The core precursor can have index variations less than about $5\times10^{-5}$ across its cross section. The core and cladding material have an interface. The fiber can be configured to support fundamental mode amplification with a mode diameter greater than about 50 µm. One or more auto-cladding features can be disposed at the interface. At least some of the auto-cladding features comprise a refractive index trough. The depth of the refractive index trough can be less than about $10^{-4}$. The width of the trough can be between about 1 µm and about 50 µm.

Embodiments of the fiber disclosed herein can be used in applications and devices including, but not limited to, a laser, an amplifier, in high-peak power/short wavelength applications, in continuum generation, in a fiber based coherent beam combiner, in a frequency comb source, in a single frequency fiber laser, in a material processing or laser radar application, in a telecommunications amplifier, and in many other applications.

Figure 4:
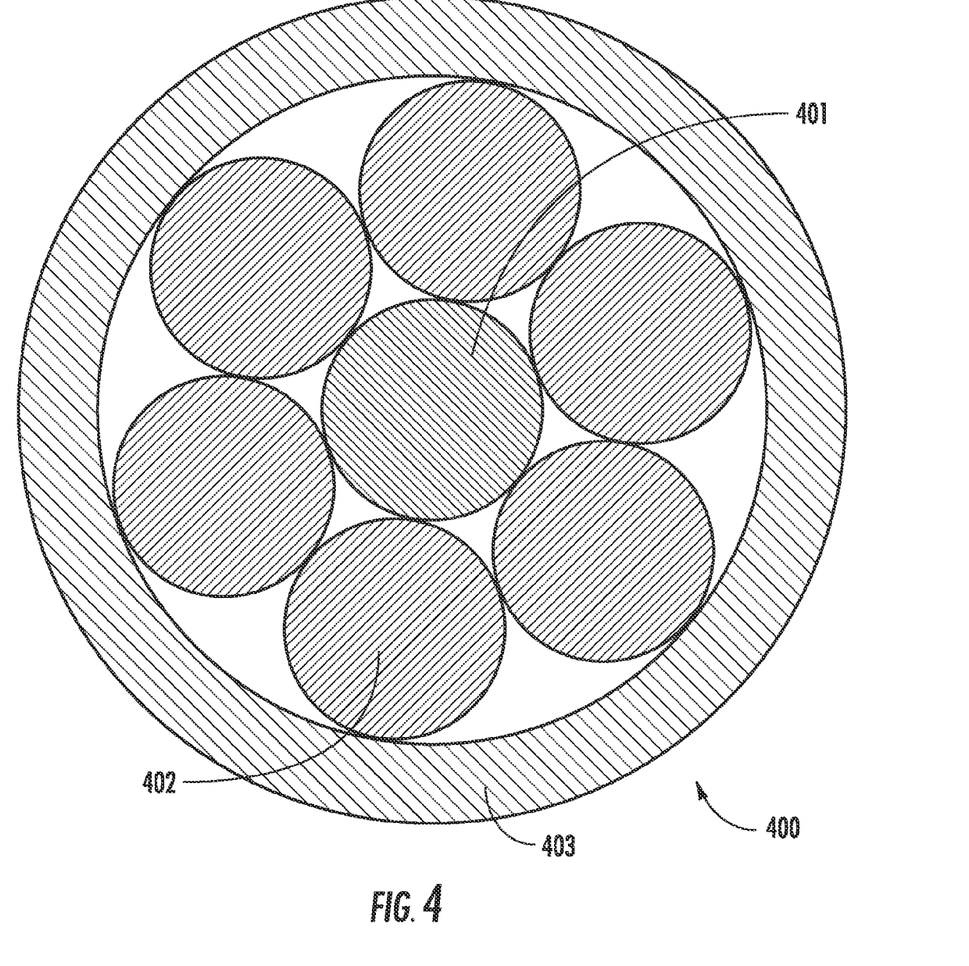
FIG. 4 schematically illustrates an example of a preform from which an auto-cladded single core fiber may be fabricated with a stack and draw fabrication technique.

Features of the embodiments schematically illustrated in FIGS. 1A-1C (including but not limited to the example refractive index profiles) can be used with any embodiments of the fiber schematically shown in FIG. 3 or fibers fabricated from embodiments of the fiber preforms schematically shown in FIGS. 4-5.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain embodiments of the disclosure have been described, these embodiments have been presented by way of example only, and are not intended to limit the scope of the disclosure. No single feature or group of features is necessary for or required to be included in any particular embodiment. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

For purposes of summarizing aspects of the disclosure, certain objects and advantages of particular embodiments are described in this disclosure. It is to be understood that not necessarily all such objects or advantages may be achieved in accordance with any particular embodiment. Thus, for example, those skilled in the art will recognize that embodiments may be provided or carried out in a manner that achieves or optimizes one advantage or group of advantages as taught herein without necessarily achieving other objects or advantages as may be taught or suggested herein.

What is claimed is:

1. An all-glass fiber comprising:
   a core and cladding material, said core and cladding material comprising an interface, said core and cladding material selected from substantially identical glasses,
   said fiber configured to support low-loss propagation of at least the lowest-order core mode,
   wherein said fiber comprises at least one of an index trough at the core-cladding interface or an index gradient within said core, and
   wherein a mode diameter of said lowest-order core mode is in a range from about 50 μm to about 500 μm,
   said fiber comprising multiple cores.

2. An all-glass fiber according to claim 1, said core and cladding material being doped with a rare-earth material.

3. An all-glass fiber according to claim 2, said fiber further configured as an optical amplifier, said amplifier comprising a near diffraction-limited pump source coupled into said fiber core.

4. An all-glass fiber according to claim 1, said fiber comprising an index trough at the core-cladding interface.

5. The all-glass fiber according to claim 4, wherein said index trough comprises an index differential less than about $10^{-4}$.

6. The all-glass fiber according to claim 4, wherein said index trough has a width in a range from about 1 μm to about 50 μm.

7. The all-glass fiber according to claim 1, wherein a refractive index difference between said core material and said cladding material is less than about $10^{-4}$.

8. An all glass fiber according to claim 1, said fiber core further comprising an index gradient inside said core with a maximum index differential of $1\times10^{-4}$ inside said core.

9. An all glass fiber according to claim 8, said index gradient arising from frozen-in stresses inside said core.

10. An all glass fiber according to claim 8, said index gradient arising from compositional variations inside said core.

11. An all glass fiber according to claim 1, said cladding material further including additional features disposed within said cladding, said features comprising a glass made of a different material than said cladding material.

12. An all glass fiber according to claim 11, said cladding material having a higher thermal expansion coefficient than the core material.

13. An all-glass fiber comprising a core and cladding material,
   said core and cladding material further having a common interface,
   said core and cladding material selected from glasses with an index differential less than about $10^{-4}$,
   said fiber further comprising at least one of an index trough at the core-cladding interface or an index gradient inside said core,
   said fiber comprising multiple cores.

14. An all-glass fiber according to claim 13, said glass fiber further comprising a rare-earth dopant inside said core.

15. An all-glass fiber according to claim 13, wherein said index gradient inside said core has a maximum index differential of $1\times10^{-4}$ inside said core.

16. An all-glass fiber according to claim 13, said index gradient arising from frozen-in stresses inside said core.

17. An all-glass fiber according to claim 13, said fiber core comprising an index gradient inside said core resulting from a non-uniform heat distribution within said fiber core.

18. A fiber amplifier comprising the all-glass fiber according to claim 13, said fiber amplifier being cladding pumped.

19. An all-glass fiber amplifier comprising:
   an all-glass fiber comprising a rare-earth doped core and cladding material, said core and cladding material comprising an interface, said rare-earth doped core and cladding material selected from glasses with an index differential less than about $10^{-4}$, said all-glass fiber comprising multiple cores;
   a near diffraction-limited pump source coupled into said rare-earth doped core;
   said rare-earth doped core configured to amplify at least the lowest-order core mode,
   wherein said fiber amplifier comprises at least one of an index trough at the core-cladding interface or an index gradient within said core.

20. An all-glass fiber amplifier according to claim 19, wherein said rare-earth doping level in said core and cladding is substantially the same and said index trough is sufficiently large that said fiber amplifier guides and amplifies at least the lowest order core mode.

21. An all-glass fiber amplifier according to claim 19, said fiber core comprising an index gradient within said core with a maximum index differential of $1\times10^{-4}$ within said core, said core having a diameter at least about 20 μm, and wherein an index profile within said core exhibits a maximum at about the center of said core and decreases from the center to an edge of said core.

22. An all-glass fiber comprising:
   a core and cladding material, said core and cladding material comprising an interface, said core and cladding material selected from substantially identical glasses,
   said fiber configured to support low-loss propagation of at least the lowest-order core mode,
   wherein said fiber comprises at least one of an index trough at the core-cladding interface or an index gradient within said core,
   said fiber comprising multiple cores.

23. An all-glass fiber according to claim 1, said core having a diameter in a range from about 20 μm to about 500 μm.

24. An all-glass fiber amplifier according to claim 21, wherein said core diameter is less than about 500 μm.

* * * * *